(12) United States Patent
Sun et al.

(10) Patent No.: US 8,131,107 B2
(45) Date of Patent: Mar. 6, 2012

(54) METHOD AND SYSTEM FOR IDENTIFYING DEFECTS IN NDT IMAGE DATA

(75) Inventors: Zhaohui Sun, Niskayuna, NY (US); Ali Can, Troy, NY (US); John Charles Janning, Cincinnati, OH (US); Robert August Kaucic, Niskayuna, NY (US); Paulo Ricardo Mendonca, Clifton Park, NY (US); Joseph Manuel Portaz, Hamilton, OH (US)

(73) Assignee: General Electric Company, Niskayuna, NY (US)

( * ) Notice: Subject to any disclaimer, the term of this patent is extended or adjusted under 35 U.S.C. 154(b) by 742 days.

(21) Appl. No.: 12/118,895

(22) Filed: May 12, 2008

(65) Prior Publication Data

US 2009/0279772 A1 Nov. 12, 2009

(51) Int. Cl.
*G06K 9/38* (2006.01)

(52) U.S. Cl. .................................. 382/272; 382/228

(58) Field of Classification Search .......... 382/254–274
See application file for complete search history.

(56) References Cited

U.S. PATENT DOCUMENTS

| RE35,423 | E | * | 1/1997 | Adams et al. .................... 378/58 |
| 5,828,778 | A | * | 10/1998 | Hagi et al. ...................... 382/145 |
| 6,292,582 | B1 | * | 9/2001 | Lin et al. ........................ 382/149 |
| 6,333,991 | B1 | | 12/2001 | Schreiber et al. |
| 6,393,095 | B1 | | 5/2002 | Robinson |
| 6,687,328 | B2 | | 2/2004 | Bavendiek et al. |
| 6,771,807 | B2 | * | 8/2004 | Coulombe et al. ............. 382/149 |
| 6,895,073 | B2 | | 5/2005 | Shih et al. |
| 7,065,176 | B2 | | 6/2006 | Moermond et al. |
| 7,272,254 | B2 | | 9/2007 | Shankarappa et al. |
| 7,558,419 | B1 | * | 7/2009 | Ye et al. ......................... 382/144 |
| 2003/0012452 | A1 | * | 1/2003 | Trifonov et al. ............... 382/275 |
| 2004/0042656 | A1 | * | 3/2004 | Timor et al. ................... 382/171 |
| 2006/0243410 | A1 | | 11/2006 | Herold |
| 2006/0245542 | A1 | | 11/2006 | Bavendiek et al. |
| 2009/0238432 | A1 | * | 9/2009 | Can et al. ....................... 382/132 |
| 2009/0274342 | A1 | * | 11/2009 | Wu et al. ........................ 382/112 |

OTHER PUBLICATIONS

L. Fillatre et al., "A Simple Algorighm for Defect Detection From a Few Rediographies," Journal of Computers, vol. 2, No. 6, Aug. 2007, pp. 26-34.

D. Mery et al., "Processing Digital X-Ray Images and Its Applications in the Automated Visual Inspection of Aluminum Castings," 3rd Pan American Conference for Nondestructive Testing—PANNDT Rio de Janeiro, Jun. 2-7, 2003. pp. 1-14.

D. Mery et al., "Automatic Detection of Welding Defects Using Texture Features," International Symposium on Computed Tomography and Image Processing for Industrial Radiology, Berlin, Jun. 23-25, 2003, pp. 1-9.

(Continued)

*Primary Examiner* — Jingge Wu
(74) *Attorney, Agent, or Firm* — Penny A. Clarke

(57) ABSTRACT

An anomaly detection method includes acquiring image data corresponding to nondestructive testing (NDT) of a scanned object. The NDT image data comprises at least one inspection test image of the scanned object and multiple reference images for the scanned object. The anomaly detection method further includes generating an anomaly detection model based on a statistical analysis of one or more image features in the reference images for the scanned object and identifying one or more defects in the inspection test image, based on the anomaly detection model.

24 Claims, 7 Drawing Sheets

OTHER PUBLICATIONS

D. Mery et al., "Pattern Recognition in the Automatic Inspection of Aluminum Castings," International Symposium on Computed Tomography and Image Processing for Industrial radiology, Berlin, Jun. 23-25, 2003, pp. 1-13.

D. Mery et al., "Automated Flaw Detection in Aluminum Castings Based on the Tracking of Potential Defects in a Radioscopic Image Sequence," IEEE Transactions on Robotic's and Automation, vol. 18, No. 6, Dec. 2002, pp. 890-901.

D. Mery et al., "A Review of Methods for Automated Recognition of Casting Defects," Insight (UK), vol. 44, No. 7, May 24, 2002, pp. 1-15.

V. Nguyen et al., "Exhaustive Detection of Manufacturing Flaws As Abnormalities," IEEE International Conference on Computer vision and pattern Recognition, Santa Barbara, California, 1998, pp. 945-952.

H. Boerner et al., "Automated X-Ray Inspection of Aluminum Castings," IEEE Transactions on Pattern Analysis Machine Intelligence, vol. 10, No. 1, Jan. 1988, pp. 79-91.

J. Mundy et al., "An Object-Oriented Approach to Template Guided Visual Inspection," IEEE International Conference on Computer Vision and Pattern Recognition, Champaign, IL., 1992, pp. 386-392.

J. Noble et al., "High Precision X-Ray Stereo for Automated 3-D CAD-Based Inspection," IEEE Transactions on Robotics and Automation, vol. 14, No. 2, Apr. 1998, pp. 292-302.

T. Parag et al., "A Framework for Feature Selection for Background Subtraction," IEEE International conference on Computer Vision and Pattern Recognition, New York, New York, 2006, pp. 1916-1923.

W. R. Scott et al., "View Planning for Automated Three-Dimensional Object Reconstruction and Inspection," ACM Computing Surveys, vol. 35, No. 1, Mar. 2003, vol. 35, No. 1, Mar. 2003, pp. 64-96.

C. Stauffer et al., "Learning Patterns of Activity Using Real-Time Tracking," IEEE Transactions on Pattern Analysis Machine Intelligence, vol. 22, No. 8, Aug. 2000, pp. 747-757.

Z. Sun et al., "Image Comparision by Compound Disjoint Information," IEEE Computer Society Conference on Computer Vision and Pattern Recognition, New York, New York, Jun. 2006, pp. 857-862.

P. Viola et al., "Alignment by Maximization of Mutual Information," International Journal of Computer Vision, vol. 24, No. 2, 1997, pp. 137-154.

A. Can et al., "Method and System for Identifying Defects in Radiographic Image Data Corresponding to a Scanned Object," U.S. Appl. No. 12/052,943, filed Mar. 21, 2008.

R. Venkatachalam et al., "Method and System for Identifying Defects in a Radiographic Image of a Scanned Object," U.S. Appl. No. 11/872,190, filed Oct. 15, 2007.

R. Venkatachalam et al., "Method for Automatic Identification of Defects in Turbine Engine Blades," U.S. Appl. No. 11/851,422, filed Sep. 7, 2007.

* cited by examiner

METHOD AND SYSTEM FOR IDENTIFYING DEFECTS IN NDT IMAGE DATA

BACKGROUND

The invention relates generally to nondestructive testing (NDT) of parts and more particularly to a method and system for automatically identifying defects in NDT image data corresponding to a scanned object.

NDT is a technique of producing relevant data for an object by collecting energy emitted by or transmitted through the object, such as by penetrating radiation (gamma rays, X-rays, neutrons, charged particles, etc.) sound waves, or light (infrared, ultraviolet, visible, etc.). The manner by which energy is transmitted through or emitted by any object depends upon variations in object thickness, density, and chemical composition. The energy emergent from the object is collected by appropriate detectors to form an image or object map, which may then be realized on an image detection medium, such as a radiation sensitive detector. A radiographic detector, for example, comprises an array of elements that records the incident energy at each element position, and maps the recording onto a two-dimensional (2D) image. The 2D image is then fed to a computer workstation and interpreted by trained personnel. Non-limiting examples of NDT modalities include X-ray, CT, infrared, eddy current, ultrasound and optical.

Radiography and other NDT inspection modalities find wide application in various medical and industrial applications as a non-destructive technique for examining the internal structure of an object. Non-destructive evaluation (NDE) of industrial parts is essential for manufacturing productivity and quality control. For example, in aerospace and automotive industries, radiographic images of aluminum castings are typically inspected by an operator who identifies defects pertaining to porosities, inclusions, shrinkages, cracks, etc. in the castings. However, and as will be appreciated by those skilled in the art, owing to the structural complexity and large production volumes of these castings, the manual inspection procedure is often prone to operator fatigue and hence suffers from low inspection reliability.

A number of NDT inspection techniques such as feature-based classification, artificial neural networks and adaptive filtering have been developed to perform automatic radiographic inspections of scanned objects. These techniques are typically based on using assisted defect recognition (ADR) techniques to automatically screen images, call out defects and prioritize the ones needing visual inspection. As will be appreciated by those skilled in the art, ADR techniques typically achieve more accurate defect detection than human operators and have a much higher efficiency and consistency, thereby enhancing quality control in a wide variety of applications, such as, for example, automotive parts and engine components of aircraft, ships and power generators. Techniques using ADR may typically be used to perform automatic defect detection on 2D images and/or 3D images, based on analyzing the geometry (e.g., shape, size), feature (e.g., intensity, texture, color) and other local image statistics in the radiographic image data, to locate abnormalities. For example, ADR techniques based on image features use a set of features to identify potential flaws in scanned object parts based on flaw morphology and gray level statistics. These techniques assign each pixel in the image into one of several classes based on minimizing a distance metric, wherein the parameters characterizing the distance metric are evaluated using a supervised learning scheme. However, the performance of these techniques is affected by variations caused by object structure or flaw morphology and these techniques generally require large training sets with labeled flaws to perform defect identification.

It would therefore be desirable to develop an efficient NDT inspection technique for automatically detecting defects in the NDT image data corresponding to a scanned object. In addition, it would be desirable to develop an efficient NDT inspection technique that detects anomalies in industrial parts, produces accurate defect detection rates, increases the screening efficiency and consistency of inspection systems, efficiently utilizes system operation setup time and system training time and is robust to changes in object part geometry and misalignment of scanned object parts.

BRIEF DESCRIPTION

In one embodiment, an anomaly detection method is provided. The anomaly detection method includes acquiring image data corresponding to nondestructive testing (NDT) of a scanned object, where the NDT image data comprises at least one inspection test image of the scanned object and multiple reference images for the scanned object. The anomaly detection method further includes generating an anomaly detection model based on a statistical analysis of one or more image features in the reference images for the scanned object, and identifying one or more defects in the inspection test image, based on the anomaly detection model.

In another embodiment, an inspection system is provided. The inspection system includes an imaging system configured to acquire image data corresponding to a scanned object. The inspection system further includes a computer system configured to be in signal communication with the imaging system. The computer system comprises a memory configured to store the image data corresponding to the scanned object, where the image data comprises at least one of an inspection test image of the scanned object and one or more reference images for the scanned object. The computer system further includes a processor configured to process the image data corresponding to the scanned object. The processor is further configured to generate an anomaly detection model based on a statistical analysis of one or more image features in the reference images for the scanned object and identify one or more defects in the inspection test image, based on the anomaly detection model. The inspection system further includes a display device configured to display the one or more defects in the image data corresponding to the scanned object.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
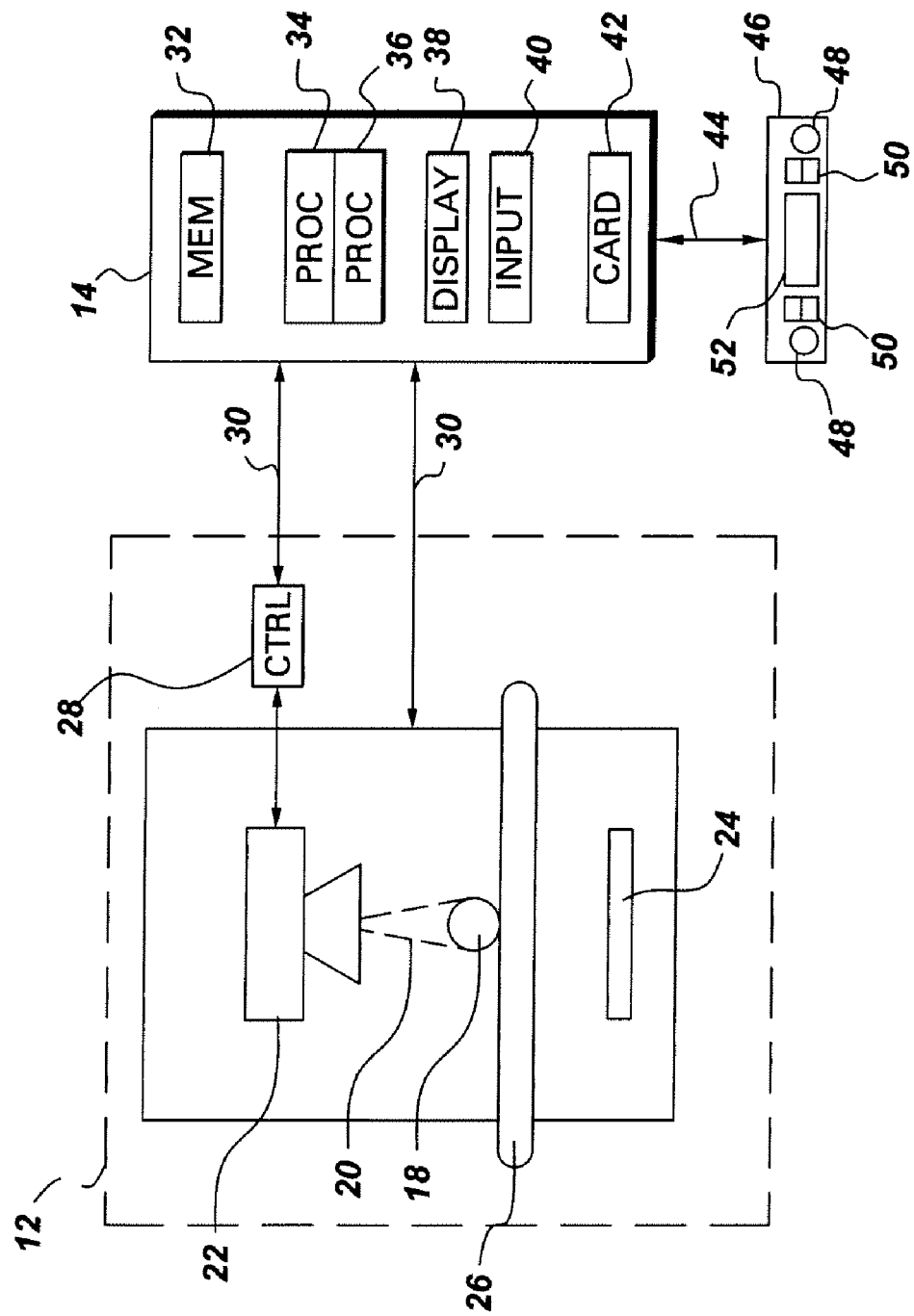
FIG. 1 is an illustration of an exemplary radiographic inspection system for processing a radiographic image of a scanned object.

FIG. 1 is an illustration of an exemplary radiographic inspection system for processing a radiographic image of a scanned object. It should be noted that although the illustrated example is directed to radiography, the present invention is equally applicable to other inspection modalities, non-limiting examples of which include X-ray, CT, infrared, eddy current, ultrasound and optical. Referring to FIG. 1, the radiographic inspection system 10 includes a computer system 14 adapted to be in signal communication with an imaging system 12 via a communication bus 30. A real-time image controller 46 is adapted to be in signal communication with the computer system 14 via another communication bus 44. The imaging system 12 is configured to acquire and output radiographic image data corresponding to a scanned object 18 via an imaging device 16. The imaging system may include, but is not limited to, an X-ray system, a CT system, an infra-red system, an eddy current system, an ultrasound system and an optical system. In one embodiment, the imaging device 16 includes an X-ray source 22, an image detector 24 and an object manipulator 26. The imaging system 12 also includes an imaging system controller 28 that receives control commands from the computer system 14 and sends control signals to the various components of the imaging device 16. The object manipulator 26 may be a conveyor belt, a reversible table, or any other suitable device for manipulating the scanned object 18 into and out of the X-ray beam 20.

The computer system 14 includes a memory 32 configured to store the radiographic image data corresponding to the scanned object. In one embodiment and as will be described in greater detail below, the radiographic image data includes an inspection test image and one or more reference radiographic images corresponding to the scanned object. Further, the memory 32 may include, but is not limited to, any type and number of memory chip, magnetic storage disks, optical storage disks, mass storage devices, or any other storage device suitable for retaining information. The computer system 14 also includes one or more processors 34, 36 configured to process the radiographic image data corresponding to the scanned object. In one embodiment, and as will be described in greater detail below, the processor is further configured to generate an anomaly detection model based on an analysis of one or more of the reference images and one or more image features in the radiographic image data corresponding to the scanned object and identify one or more defects in an inspection test image based upon the anomaly detection model.

For the illustrated example shown in FIG. 1, the computer system 14 also includes a detector interface card 42, an input device 40 and a display device 38. The input device 40 may include, but is not limited to, a keyboard, a mouse, a pointing device, a touch sensitive screen device, a tablet, a read/write drive for a magnetic disk, a read/write drive for an optical disk, a read/write drive for any other input medium, an input port for a communication link (electrical or optical), a wireless receiver. The display device 38 may be a CRT (cathode ray tube) screen or any other suitable display device for displaying text, graphics and a graphical user interface, for example. In one embodiment, the display device is configured to display one or more defects in the radiographic image corresponding to the scanned object. The input device 40 and the display device 38 operate in combination to provide a graphical user interface, which enables a user or operator to configure and operate the radiographic inspection system 10. The detector interface card 42 provides low-level control over the image detector, buffers data read out from the image detector 24, and optionally reorders image pixels to convert from read-out order to display order. The real-time image controller 46 includes a set of image control buttons 50, a set of image control dials 48, a display 52, and an embedded application programming interface that maps the functions of the control buttons and dials 48, 50 to the computer system 14.

Figure 2:
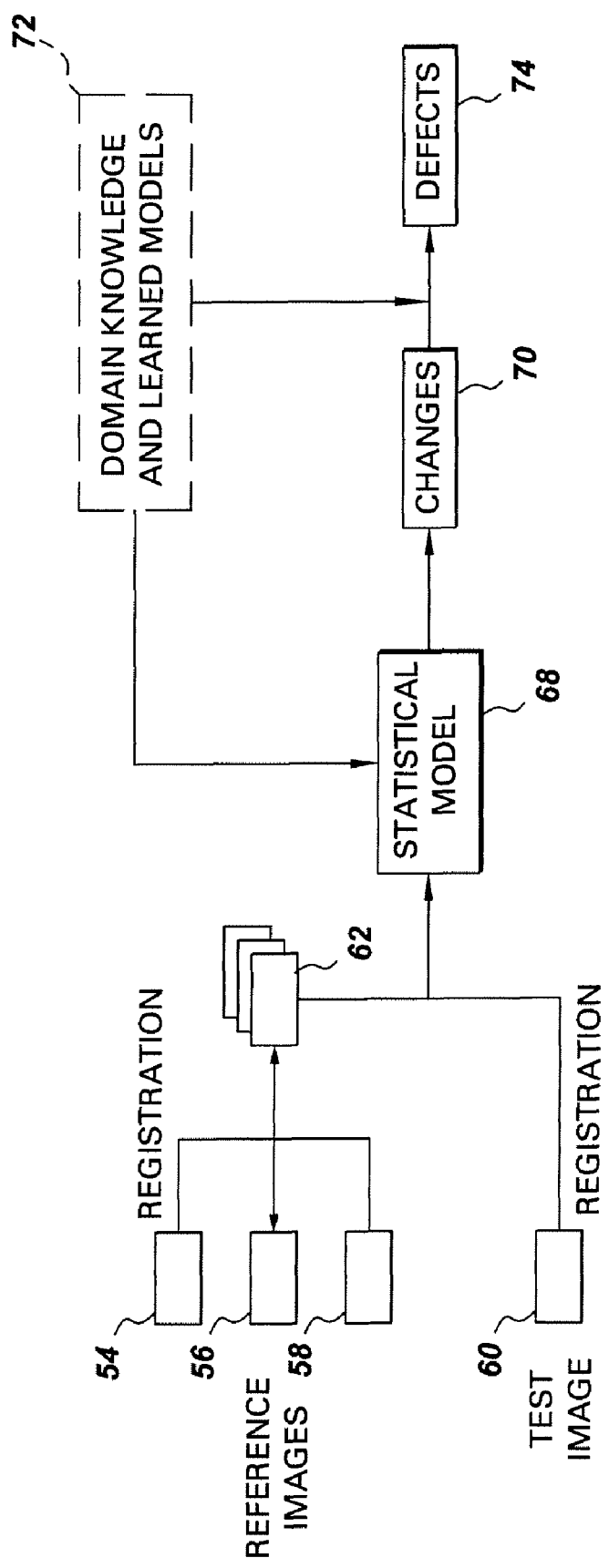
FIG. 2 is a block diagram illustrating a technique for identifying defects in NDT image data corresponding to a scanned object, in accordance with one embodiment of the present invention.

FIG. 2 is a block diagram illustrating a technique for generating a statistical model and identifying defects (anomalies) in NDT image data corresponding to a scanned object, in accordance with one embodiment of the present invention. For certain applications, the defects may include, but are not limited to, casting and/or manufacturing defects present in a scanned object. Further, in certain applications, the scanned object may include industrial parts, such as, for example, turbine engine components. The scanned object may also include, automotive parts such as, casting wheels, engine components, and shafts, in other example applications. Referring to FIG. 2, now, image data corresponding to nondestructive testing (NDT) of a scanned object is initially acquired, using, for example, a radiographic inspection system, such as, as described in FIG. 1. In one embodiment, the NDT image data includes an inspection test image 60 and one or more reference (defect-free) images 54, 56 and 58. It may be noted that the number of defect-free images acquired as shown in FIG. 2 are for illustrative purposes only, and not meant to limit the number of defect-free images that may be acquired by the inspection system 10 in any particular implementation. In a particular embodiment, the defect-free images 54, 56 and 58 include one or more template images of the scanned object obtained at a number of intermediate steps in a manufacturing process corresponding to the industrial part being scanned.

According to particular embodiments, the image data is pre-processed by image registration and image normalization, yielding a stack of spatially aligned and appearance-normalized images 62. In accordance with embodiments of the present invention, and as will be described in greater detail below, the statistical model (anomaly detection model) 68 of the scanned object is generated based upon an analysis of the pre-processed defect-free images and one or more image features in the NDT image data, and one or more defects in the NDT image data corresponding to the scanned object. The statistical model 68 implicitly captures the normal image-to-image variation of defect-free parts, including the spatial misalignment, image-to-image appearance change, and manufacturing variation within specification. In one embodiment, the statistical model 68 may be represented as a non-parametric statistical model by Parzen windowing density approximation. In another embodiment, the statistical model 68 may be represented as a parametric model of Gaussian mixture with varying mean and variance. When the pre-processed inspection test image data is compared with the statistical model, anything outside a normal variation range is called out as a potential change 70. Based on the indications, the learned statistics and domain knowledge 72, defects are identified, including the defect type, location, and size measurement.

Figure 3:
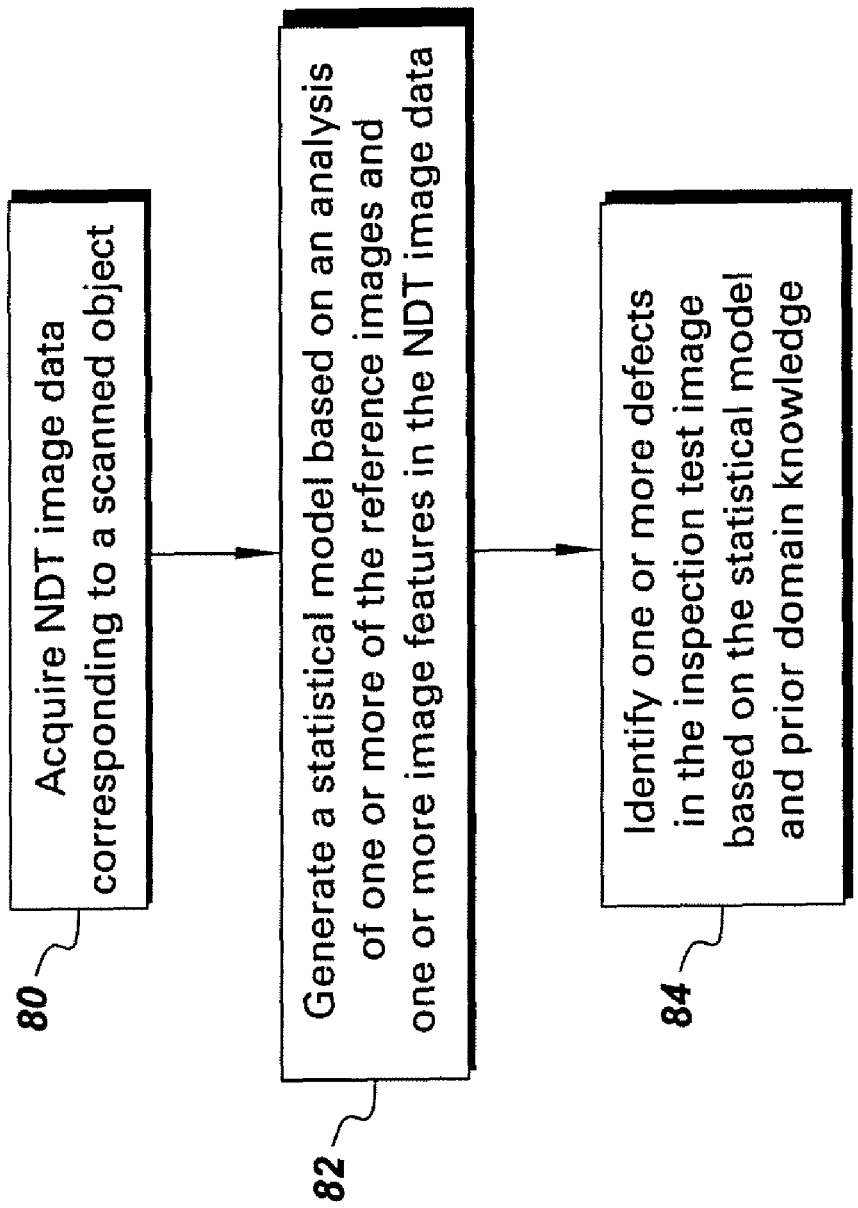
FIG. 3 is a flowchart illustrating exemplary steps for identifying defects in NDT image data corresponding to a scanned object, in accordance with one embodiment of the present invention.

FIG. 3 is a flowchart illustrating exemplary steps for identifying defects in NDT image data corresponding to a scanned object, in accordance with one embodiment of the present invention. In step 80, NDT image data corresponding to a scanned object is acquired. For certain applications, the NDT image data comprises radiographic image data and is acquired using a radiographic inspection system as described in FIG. 1. Other examples of NDT image data include without limitation X-ray, CT, infrared, eddy current, ultrasound and optical image data. In a particular embodiment, and as mentioned above, the NDT image data includes an inspection test image and one or more reference (or defect-free) images. In step 82, a statistical model (anomaly detection model) is generated based on an analysis of the defect-free images and one or more image features in the NDT image data corresponding to the scanned object. In step 84, one or more defects are identified in the inspection test image by the use of the statistical model and prior knowledge of the scanned object. The specific details in steps 82 and 84 are further illustrated in FIG. 4 and FIG. 6, respectively.

Figure 4:
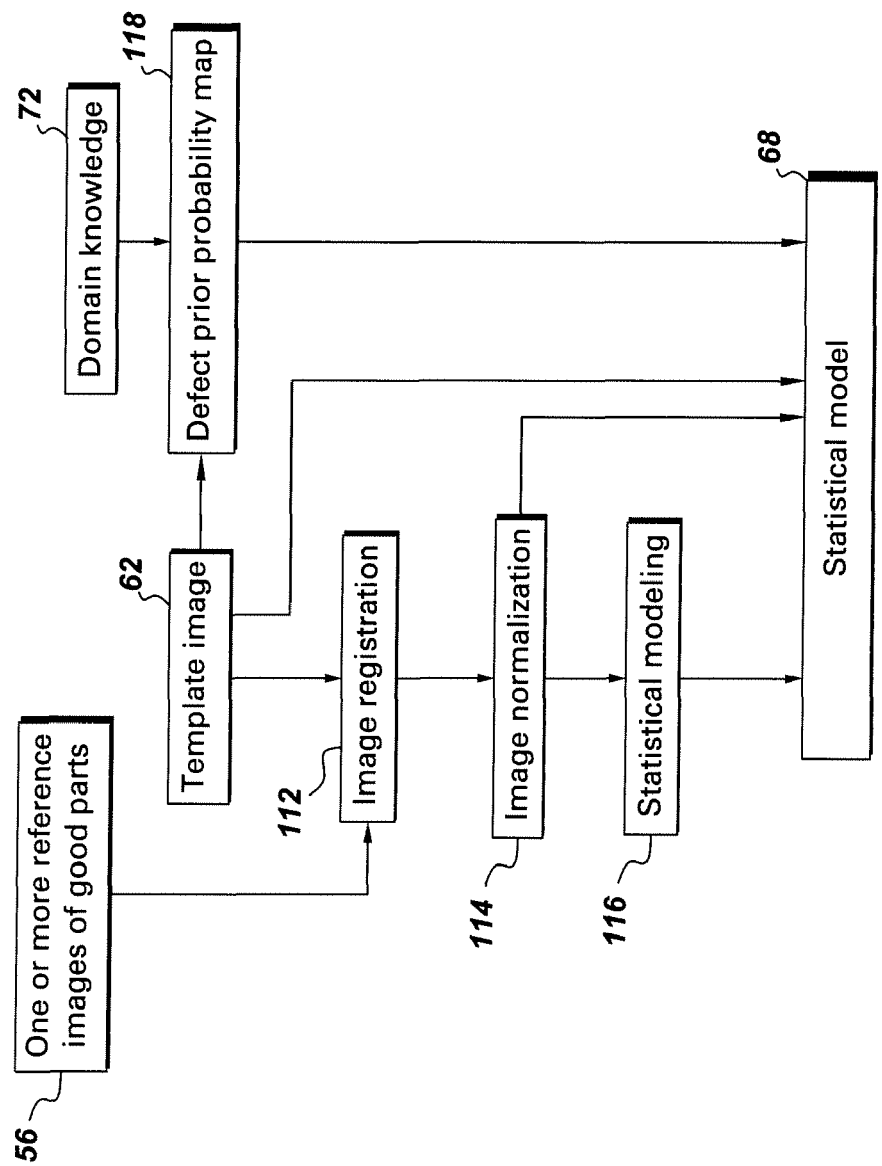
FIG. 4 is a flowchart illustrating exemplary steps for generating statistical models from defect-free images of a scanned object, in accordance with one embodiment of the present invention.

FIG. 4 illustrates a specific embodiment for performing step 82 in FIG. 3 to generate the statistical model of a scanned object by the use of multiple reference (defect-free) images. Notably, this modeling process need only be performed once for the same type of scanned objects. As shown for example in FIG. 4, at step 112 of the image registration, an analysis of the defect-free images typically includes choosing a template image 54 from the set of defect-free images and spatially aligning the remaining images with the template image, in a common coordinate system. In one embodiment, a pairwise image registration may be performed to spatially align the defect-free images 56 with the template image 54 to derive a stack of spatially aligned images 62. The pairwise image registration of the defect-free images may be optimized by one of the registration metrics known in the art, such as, for example, disjoint information, mutual information, mean squared error, normalized correlation and gradient difference. As will be appreciated by those skilled in the art, image registration typically includes finding the optimal geometric transform between two or more images that brings a moving image into spatial alignment with a fixed image. The geometric transform may be represented by different models such as, for example, translation, rotation, scaling, shear, rigid, similarity, affine, perspective piecewise affine and deformable models. In a particular embodiment, an image registration based upon a minimization of disjoint information criterion is performed to spatially align the defect-free images to derive a stack of spatially aligned images 62. As will be appreciated by those skilled in the art, an image registration technique based upon a minimization of disjoint information criterion typically includes computation of the entropies of the fixed image, the moving image, the joint entropy, and a geometric transform that minimizes the matching cost of disjoint information.

For the illustrated embodiment shown in FIG. 4, an analysis of the images typically involves image intensity normalization, as at step 114 in FIG. 4. Certain radiographic image data is suited for qualitative evaluation, but not for quantitative evaluation without specific calibration. As will be appreciated by those skilled in the art, appearance shifts caused due to minor part variations, positioning and attenuation differences due to source and detector gain variations, may be typically observed in the radiographic image data. Such a variation can be compensated for by image normalization. In one embodiment, the images are normalized by 2-D median filtering with a large radius, generating a spatially variant baseline image, which is subtracted from the image under analysis to factor out the spatially variant appearance change.

The statistical modeling step 116 in FIG. 4 further comprises generating a non-parametric statistical distribution for one or more of the image features in the NDT image data, at one or more pixel locations. Non-limiting examples of the image features include image intensity, color and texture. In one embodiment, the step of generating a non-parametric statistical distribution for one or more of the image features further includes computing a probability density function (PDF) for each pixel at a particular pixel location in the baseline image. In a particular embodiment, the PDF for each pixel may be computed as a function of a defect probability of a pixel at a particular pixel location and a defect prior term. For example, the PDF for a pixel may be computed as shown in equation (2) below:

$$p(y/x) \alpha\ p(x/y)*p(y) \qquad (2)$$

where y is the pixel state or defect label, x is the computed low-level image feature, such as intensity, color, texture, and gradients, p(y/x) represents the probability of a particular state or defect label given the image observation, namely p(x/y) is a likelihood term that represents the defect probability of a pixel at a particular pixel location, given a particular defect label, and p(y) represents the prior term for a given a set of defects. The PDF p(y/x) computed for each pixel is proportional to the product of the likelihood term p(x/y) and the prior term p(y) based on the Bayes rule. In one embodiment, the image state y may include, for example, a label of being normal, having excess material, or having material loss. Specifically, if an image is represented by a set of conditionally independent low-level features, $x^1, \ldots, x^k$, wherein x represents an image feature such as, image intensity, texture and/or color, the likelihood term may further be decomposed as shown in equation (3) below.

$$p(x/y) = p(x^1, \ldots x^k/y) = \prod_{k=1}^{K} p(x^k/y) \qquad (3)$$

If the logarithm of the likelihood is computed, a summation is obtained as shown in equation (4) below:

$$\log p(x/y) = \sum_{k=1}^{K} \log p(x^k/y) \qquad (4)$$

For a total of N defect-free images, at each pixel location (u, v), the probability distribution p(x(u,v)|y(u,v)) may be approximated by a mixture of local kernels. Accordingly, and in one embodiment of the present invention, the non-parametric statistical model 68 may be generated using a Parzen window density estimation technique or a Gaussian mixture with varying mean and standard deviation technique. Referring to equation (4) now, when the kernel is chosen as a Gaussian distribution $G(\mu,\sigma)$, with a fixed standard deviation of $\sigma$, the PDF for each pixel may be approximated by a Gaussian mixture through Parzen windowing as follows:

$$p(x/y) = 1/N \sum_{n=1}^{N} G(x/y; x_n, \sigma) \quad (5)$$

$$= 1/\sqrt{2\pi\sigma N} \sum_{n=2}^{N} e^{-(x-x_n)^2}/2\sigma^2$$

where $x_n$ is an image feature (e.g., intensity) at a particular pixel location (u,v).

Figure 5:
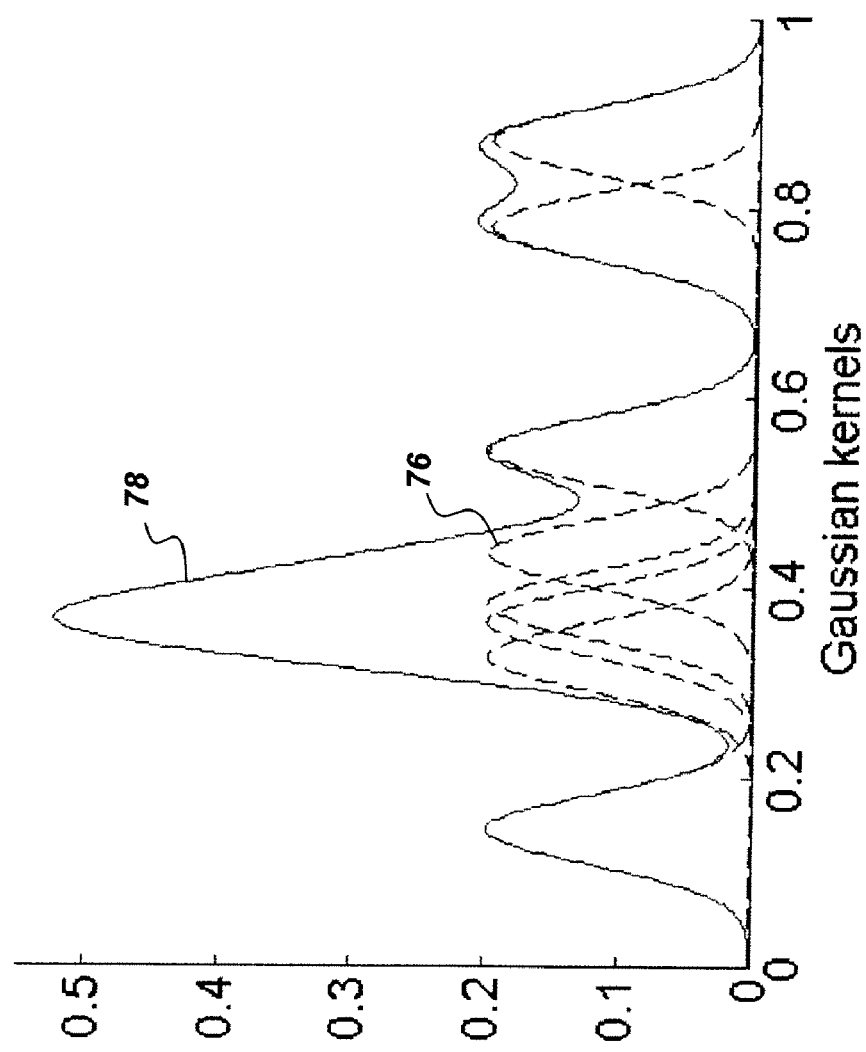
FIG. 5 is a graph illustrating the Gaussian mixture model based on the feature values taken from eight different images at the same pixel location.

FIG. 5 is a graph illustrating normalized intensity code values taken from eight different images at one or more pixel locations. In one embodiment, the graph illustrated in FIG. 5 is generated using observations from a large number of pre-processed defect-free images images, and the PDF at each pixel location is approximated by a Gaussian mixture. As illustrated in FIG. 5, a Gaussian kernel $G(x_n, \sigma)$ is fit at each point, as indicated by the reference numeral 76. The summation of the Gaussian mixture yields the PDF, as indicated by the reference numeral 78. Specifically, in a particular embodiment, the value of the PDF of a pixel, outside the normal range is considered to be a potential defect. Also, as will be appreciated by those skilled in the art, observations typically have a lower uncertainty in defect-free regions and a higher uncertainty along the structure boundary caused due to spatial misalignment and part-to-part variation of the industrial part. The anomaly detection (statistical) model 68 disclosed in accordance with the present invention may be used to effectively factor out such process noise and irrelevant image changes for defect recognition. Referring again to the graph illustrated in FIG. 5, it may be observed that most of the observations are concentrated in the range of [0.22, 0.68]. Furthermore, and as will be appreciated by those skilled in the art, typical casting and/or manufacturing defects that may occur in turbine engine blades may include defects caused due to excess material (e.g., shots), defects caused due to missing material defects (e.g., casting defects) and scarfs, overdrills and misdrills. Accordingly, in one embodiment, the Gaussian mixture generated using the graph shown in FIG. 5 is an effective technique for detecting both positive and negative material defects, by studying the tails of the distribution at both ends. In one embodiment, one-sided kernels for positive or negative detection, such as the one-sided Gaussian kernel may be derived, as shown in equation (6) below:

$$G'(x; \mu, \sigma) = \{2G(x; \mu, \sigma) \text{ if } x \geq \mu \text{ and } 0 \text{ otherwise}\} \quad (6)$$

As may also be observed from the graph illustrated in FIG. 5, observations having a normalized feature value over 0.68 or below 0.22 are potentially drawn from regions containing positive or negative materials.

Referring again to equation (2) and to and step 118 in FIG. 4, in one embodiment, the prior term P(y) is used to constrain the potential anomalies in the industrial part, based on domain and/or prior knowledge 72 of the industrial part. In one embodiment, the prior term P(y) may be determined based upon a region of interest (ROI) mask. In a particular embodiment, the ROI mask is a labeled mask image indicating the probability of defects appearing in certain regions in the radiographic image data corresponding to the scanned object. For example, excess material in the scanned object may appear in the cavities and chambers, and not on the thick walls. The ROI mask may also be used to exclude certain regions, such as the background region and other regions that are not of interest. Further, the ROI mask image may be manually drawn or outlined using a Computer Aided Analysis (CAD) model. In one embodiment, the ROI mask may be computed from image content information. For example, the probability of having excess material is inversely proportional to the material thickness, i.e., the intensity code value. The prior term/ROI mask may also be derived from the neighboring pixel sites using the Markov random field, in another embodiment.

Based on the PDF derived using the likelihood term and the prior term as shown in equations (2), (3), (4) and (5), the anomaly detection model 68 may be derived as shown in equation (7) as follows:

$$M = (p_j(u,v), p_j^\alpha(u,v), I_T(u,v), I_0(u,v), Q_j, S_j, \sigma_j) \quad (7)$$

where $p_j(u,v)$ represents the likelihood/defect probability of a pixel at a particular pixel location (u, v), $p_j^\alpha(u,v)$ represents the defect prior term at pixel location (u, v) based on the domain knowledge, $I_T$ represents the template image 54 used for spatial alignment, $I_0$ represents the baseline image for appearance normalization, j is a defect index, $Q_j$ represents the probability threshold separating normal from abnormal variations, $S_j$ is the minimum defect size and $\sigma_j$ is the standard deviation of the Gaussian kernel. In one embodiment, the likelihood term $p_j$ and the prior term, $p_j^\alpha$ are used for statistical analysis, the template image $I_T$ and baseline image $I_0$ are used for spatial and appearance normalization and the parameters, $(Q_j, S_j, \sigma_j)$ are used as an operating point for defect detection. In one embodiment and as will be described in greater detail below, the parameters of $(Q_j, S_j, \sigma_j)$ are derived using a region analysis procedure, based on a large set of defect-free images and a relatively smaller set of labeled defect images.

As noted above the statistical modeling of FIG. 4 (step 82 in FIG. 3), need only be performed only for each type of object of interest. The detection step 84 indicated in FIG. 2 is discussed in detail below with reference to FIG. 6.

Figure 6:
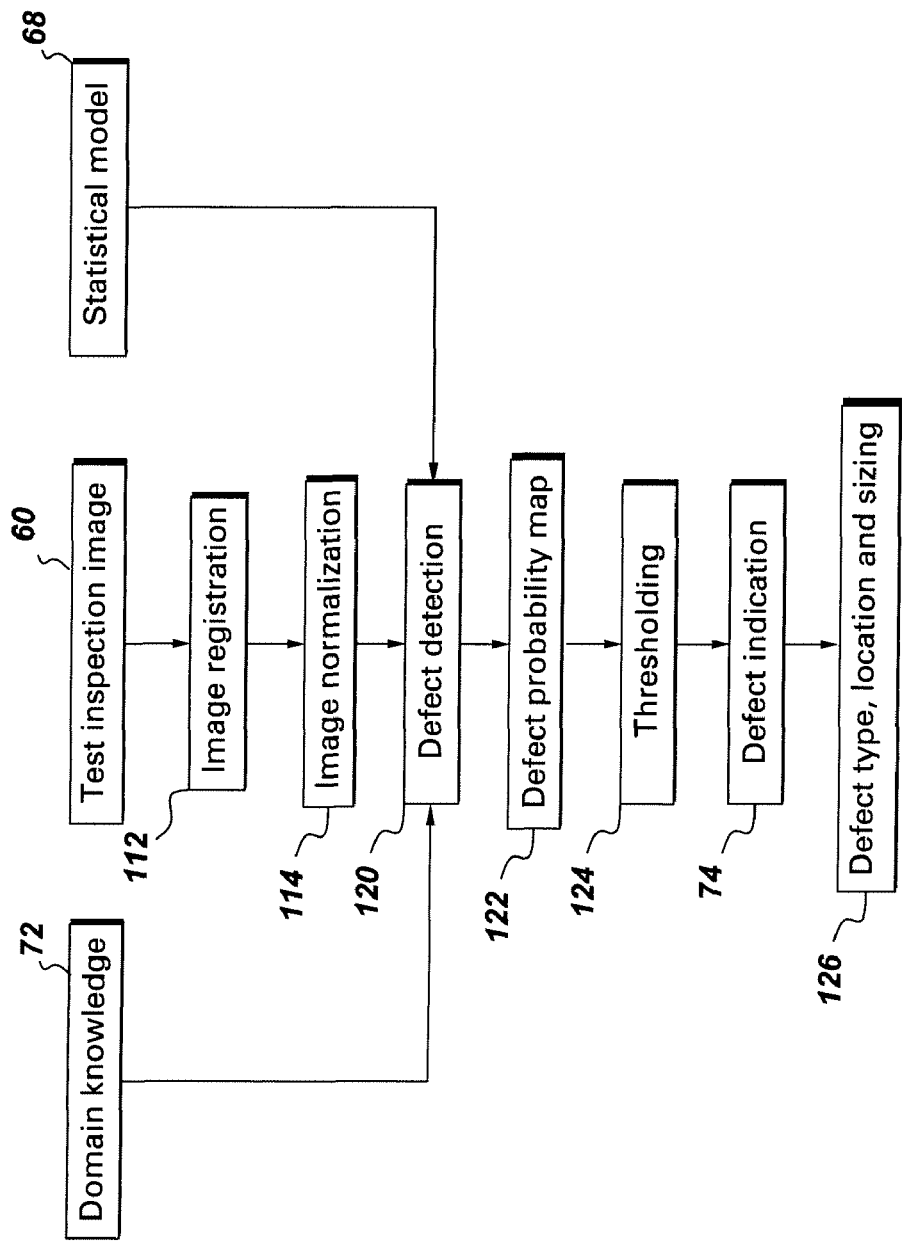
FIG. 6 is a flowchart illustrating exemplary steps for identifying defects on an inspection test image based on statistical models and prior domain knowledge of a scanned object, in accordance with one embodiment of the present invention.

Referring to FIG. 6, one or more defects 74 in the NDT data corresponding to the scanned object are identified as follows. For the illustrated embodiment, at step 112, the inspection test image I 60 is aligned with the template image, 54, and normalized with respect to the stack of pre-processed defect-free images in step 114. One or more image features from the inspection test image I 60 are extracted and compared with the anomaly detection (statistical) model 68. A defect probability map 122 is derived from the defect recognition step 120 for each defect type, indicating the probability of a particular pixel having a particular defect. Specifically, referring to the definition of the statistical model 68 derived in equation (7), in one embodiment, a pixel is detected to be a defective pixel, by thresholding the defect probability map, if the probability is over the threshold, $Q_j$, the defect size is larger than $S_j$ and all the prior domain constraints are met. This process is repeated for all defect types until all potential defects are evaluated in the inspection test image. Domain knowledge 72 in the form of prior distribution and learned statistics 68 may further be employed to confirm if the image changes correspond to defect indications. Defect type, location, and size are further determined in step 126.

Figure 7:
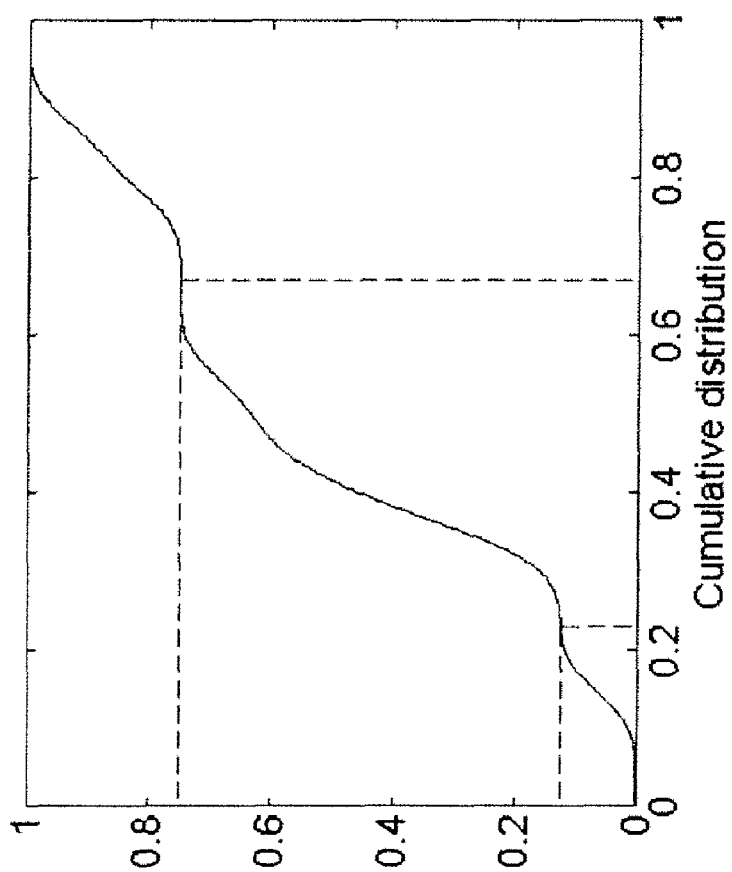
FIG. 7 is a graph illustrating cumulative density function (CDF) values plotted for one or more features at the same more pixel location.

In accordance with another embodiment of the present invention, a cumulative density function (CDF) for each pixel at a particular pixel location may further be computed based upon the PDF generated for each pixel. FIG. 7 is a graph illustrating the cumulative density function (CDF) values plotted for one or more pixels at one or more pixel locations. In one embodiment, the cumulative density function (CDF) may be evaluated as shown by equation (8) below:

$$P(y/x) = \int_{-\infty}^{y} p(t/x) dt \quad (8)$$

In a particular embodiment, one or more defects in the radiographic image data corresponding to a scanned object may be further identified by using the CDF computed for each pixel. Specifically, in one embodiment, an anomaly detection function or a mapping function may be defined based upon the CDF. In one example, the mapping function may be defined as a labeling function that maps an image observation I to a defect label L at a particular pixel location (u, v) as shown in equation (9) below:

$$F: I(u,v) \Rightarrow L(u,v) \quad (9)$$

In other words, the mapping function maps one or more of the extracted image features in the inspection test image to one or more defect labels at each pixel location in the inspection test image to detect the defects in the inspection test image. In a particular embodiment, the mapping function determines at least one of a defect indication and a defect type in the inspection test image, based upon the CDF computed for each pixel, as follows:

$$f(x) = \{1 \text{ if } P(y/x) > Q^1, -1 \text{ if } P(y/x) < Q^2 \text{ and } 0 \text{ otherwise}\} \quad (10)$$

Accordingly if the CDF for a pixel, i.e., P(y/x), is greater than the threshold, $Q^1$, or below the threshold, $Q^2$, then the pixel is identified as a defective pixel. Referring to the graph illustrated in FIG. 7, in a particular example, pixels with a CDF of over $Q^1=0.75$ are defined as potential excess material defects and pixels with a CDF below $Q^2=000.18$ are defined as potential negative material defects. Specifically, in one embodiment, the mapping function further determines if an image pixel is a defective pixel in the inspection test image, based upon a comparison of the CDF derived for each image pixel and least one of the defect probability threshold, the defect size and one or more prior domain constraints derived using the anomaly detection model, as defined in equation (7) above. More particularly, the defect probability threshold, the defect size and the one or more prior domain constraints may be derived using receiver operating characteristic (ROC) analysis based on the anomaly detection (statistical) model. In a particular example, pixels having defect probability threshold values of over $Q_j$ and pixels present within regions larger than $S_j$ are kept for further analysis.

In accordance with another embodiment of the present invention, a region analysis procedure may be performed to alleviate incidental detection due to noisy image data, image misalignment and image appearance change. For example, in one embodiment, a region analysis procedure may be performed to identify the potential defective pixels, wherein pixels that are present within regions that are larger than $S_j$ are confirmed as defective pixels. In a particular embodiment, a connected component analysis may be performed to identify the potential defective pixels. As will be appreciated by those skilled in the art, a connected component analysis includes finding the largest image region in which there is a direct connection between any two pixels.

Thus, the defect size may be determined by connected component analysis for certain embodiments. In other embodiments, the defect prior is designated by defect masks with regions of interest or is related to image intensity of part thickness. In other embodiments, the defect prior is enforced through a neighborhood constraint, such as a Markov random field. For certain embodiments, the method further includes dynamically updating the anomaly detection model as the image data are acquired. In this manner, the anomaly detect model is adapted to the data on the fly.

In addition, the method is applicable to data acquired for multiple views. According to particular embodiments, the method further includes acquiring the image data for the scanned object for multiple views, generating the anomaly detection model using the image data obtained for the multiple views. identifying one of more defects using the anomaly detection model for the multiple views, and combining the identified defects for the multiple views to make a determination regarding the scanned object. Non-limiting examples of determinations that can be performed include determining whether the part meets predetermined specifications or whether the part needs to be subjected to rework or scrapped. In this manner, the identified defects resulting from multiple views of the scanned object can be combined to make collective determinations about the scanned object.

In addition, the method is suited for integration with the data capture process to screen the captured data on the fly. In particular embodiments, the method further includes capturing the identified defects as metadata and attaching the metadata to the respective acquired image data. Moreover, the statistical modeling approach of the present method can be integrated into the image review process to aid visual inspection, including prioritizing the images and views need to be reviewed, highlighting the regions with high probibility of certain defects, and measuring the size of the defect indications.

Embodiments of the present invention disclose a statistical modeling technique to identify defects in radiographic image data corresponding to a scanned object, by generating non-parametric statistical distributions based on observations of defect-free images and computed image features, extracting image features in the inspection test image and comparing the extracted image features with the learnt statistical model to identify defects in the radiographic image corresponding to the scanned object. The disclosed statistical modeling approach is efficient, produces accurate defect detection rates and efficiently utilizes system operation time and system training time. Further, the disclosed statistical modeling approach increases screening efficiency and consistency of inspection systems by filtering out the defect-free images and prioritizing the images needing visual inspection, thereby increasing throughput and efficiency. In addition, the disclosed statistical modeling approach is robust to changes in object part geometry and misalignment of scanned object parts since it is built using a number of defect-free images that can automatically encode normal variations that occur due to part-to-part variations within manufacturing specifications and image-to-image variations that occur due to appearance changes and spatial misalignment.

In addition, the disclosed statistical modeling approach for detecting defects may be applied to multiple observations corresponding to multiple images of the scanned object acquired at one or more view angles. Furthermore, the disclosed technique can be applied to three dimensional (3D) image volumes, wherein the disclosed statistical modeling approach can be applied to defect-free 3D volumes to evaluate a test volume for potential defect indications. Further, the nondestructive imaging geometry may correspond to a 2D projection (e.g. X-ray projection and infra-red thickness), 3D volume (e.g. CT), or 4D spatiotemporal sequence. Hence, the domain of the radiographic image and statistical modeling can be 2D, 3D, or 4D, respectively. Further, the disclosed statistical modeling approach can be combined with a Computer Aided Design (CAD) model to enable the detection of defects in the radiographic image data corresponding to the scanned object with greater accuracy.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An anomaly detection method comprising:
acquiring image data corresponding to nondestructive testing (NDT) of a scanned object, wherein the NDT image data comprises at least one inspection test image of the scanned object and a plurality of defect-free images of the scanned object;
pre-processing the NDT image data, wherein said pre-processing includes image normalization;
generating an anomaly detection model based on a statistical analysis of the preprocessed defect-free images and one or more image features in the NDT image data and one or more defects in the NDT image data corresponding to the scanned object; and
identifying one or more defects in the inspection test image, based on the anomaly detection model.

2. The method of claim 1, wherein the statistical analysis comprises determining a likelihood of a defect and a prior probability of the defect.

3. The method of claim 2, further comprising performing at least one of:
specifying at least one defect type and location for the scanned object using the anomaly detection model;
measuring a defect size for the scanned object using the anomaly detection model; and
creating at least one anomaly probability map for the respective defect type using the anomaly detection model.

4. The method of claim 2, wherein the prior probability of the defect is based at least in part on domain knowledge.

5. The method of claim 1, wherein the step of generating the anomaly detection model further comprises spatially aligning the test image with a template image and deriving a baseline image from the one or more spatially aligned defect-free images.

6. The method of claim 5, wherein spatially aligning the test image further comprises performing at least one of:
a pairwise image registration between the inspection test image and the template image; or
a multi-image registration, wherein a plurality of the test images are aligned with the template image simultaneously.

7. The method of claim 5, wherein the step of generating the anomaly detection model further comprises performing image appearance normalization to remove image-to-image appearance changes due to variation in image formation and appearance shift.

8. The method of claim 5, wherein the step of generating the anomaly detection model further comprises generating a non-parametric kernel mixture by Parzen window density approximation for one or more of the image features in the image data, at one or more pixel locations in the template image, and wherein the image features comprise at least one of pixel intensity, texture and color.

9. The method of claim 5, wherein the step of generating the anomaly detection model further comprises generating a parametric Guassian mixture with a varying mean and a varying standard deviation for one or more of the image features in the NDT image data, at one or more pixel locations in the template image, and wherein the image features comprise at least one of pixel intensity, texture and color.

10. The method of claim 8, wherein the step of generating the non-parametric statistical distribution for one or more of the image features further comprises computing a probability density function (PDF) for each pixel at one or more of the pixel locations.

11. The method of claim 10, wherein the PDF for each pixel is computed based on determining at least one of a defect probability of a pixel at a particular pixel location and a defect prior term.

12. The method of claim 10, wherein the step of generating the anomaly detection model further comprises computing a cumulative density function (CDF) for each pixel at a particular pixel location based on the PDF, wherein the step of identifying the one or more defects in the inspection test image based on the anomaly detection model, is implemented using the CDF or PDF computed for each pixel.

13. The method of claim 12, wherein the step of identifying one or more defects in the inspection test image further comprises determining if a pixel is a defective pixel using a mapping function, wherein the mapping function determines at least one of a defect indication and a defect type in the inspection test image, based on the CDF or PDF computed for each pixel and on the defect prior term.

14. The method of claim 13, wherein the step of identifying one or more defects in the inspection test image further comprises extracting one or more image features in the inspection test image and comparing the extracted image features with the anomaly detection model.

15. The method of claim 14, wherein the step of identifying one or more defects in the inspection test image using the mapping function further comprises mapping one or more extracted image features in the inspection test image to one or more defect labels at each pixel location in the inspection test image.

16. The method of claim 15, wherein the mapping function further determines if an image pixel is a defective pixel in the inspection test image, based upon a comparison of the PDF or CDF derived for each image pixel and at least one of a defect probability threshold, a defect size and one or more prior domain constraints.

17. The method of claim 16, further comprising identifying one or more defective regions of interest in the inspection test image based on identifying one or more of the defective pixels that form a region of interest of a particular size in the inspection test image.

18. The method of claim 13, wherein the step of generating the anomoly detection model further comprises further generating a parametric Guassian mixture with a varying mean and a varying standard deviation for one or more of the image features in the inspection test image, at one or more pixel locations in a template image.

19. The method of claim 1, wherein the step of acquiring NDT image data corresponding to the scanned object comprises acquiring multiple images of the scanned object at a plurality of view angles.

20. The method of claim 1, wherein the NDT image data corresponding to the scanned object is acquired using an NDT inspection system, and wherein the NDT inspection system comprises an imaging system selected from the group consisting of an X-ray system, a CT system, an infra-red system, an eddy current system, an ultrasound system and an optical system.

21. The method of claim 1, further comprising dynamically updating the anomaly detection model, as the image data are acquired.

22. The method of claim 1, further comprising:
acquiring the image data for the scanned object for multiple views;
generating the anomaly detection model using the image data obtained for the multiple views;
identifying one of more defects using the anomaly detection model for the multiple views; and combining the identified defects for the multiple views to make a determination regarding the scanned object.

23. The method of claim 1, further comprising:
capturing the identified defects as a plurality of metadata; and
attaching the metadata to the respective acquired image data.

24. An inspection system comprising:
an imaging system configured to acquire image data corresponding to a scanned object; and
a computer system configured to be in signal communication with the imaging system, wherein the computer system comprises:
 a memory configured to store the image data corresponding to the scanned object, wherein the image data comprises at least one inspection test image of the scanned object and one or more defect-free images of the scanned object;
 a processor configured to process the image data corresponding to the scanned object, wherein the processor preprocess and normalizes the defect-free images, and the processor is further configured to generate an anomaly detection model based on a statistical analysis of one or more image features in the normalized defect-free images for the scanned object and identify one or more defects in the inspection test image, based on the anomaly detection model; and
 a display device configured to display the one or more defects in the image data corresponding to the scanned object.

* * * * *